United States Patent Office 2,780,914
Patented Feb. 12, 1957

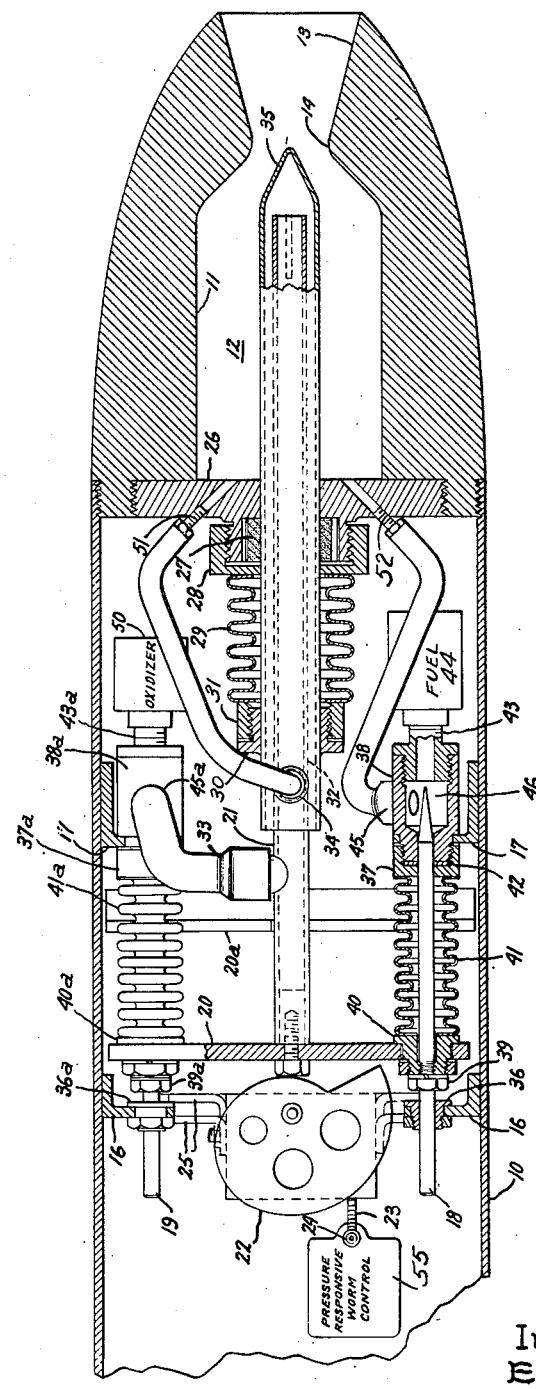

2,780,914

AMBIENT PRESSURE RESPONSIVE CONTROL FOR FUEL OXIDIZER AND NOZZLE EXHAUST AREA OF REACTION MOTORS

Elliot Ring, Schenectady, N. Y., assignor to General Electric Company, a corporation of New York Application December 20, 1951, Serial No. 262,638

2 Claims. (Cl. 60—35.6)

This invention relates to a reaction motor control structure. More particularly, the invention relates to an apparatus for obtaining the maximum thrust efficiency from the combustion of fuel under changing external pressure conditions, or when throttling is desired. The term "external pressure" as used herein refers to the pressure existing in the medium external to the combustion chamber of the reaction motor.

In a reaction motor, such as a jet motor, rocket motor, ram-jet, and other types of reaction motors, the thrust can be increased by increasing the fuel rate or the exit velocity of the jet stream. It is usually not desirable to increase the rate of feed of the fuel for reasons of fuel economy as well as the fact that a higher rate will subject the combustion chamber to more pressure than it can withstand if the throat area is fixed. Accordingly, the most promising approach to improved performance lies along the line of increased jet stream velocity.

The velocity of the jet stream is a function of the combustion chamber temperature and pressure and the exit pressure as well as the ratio of specific heat of the fuel being used and the velocity of the gas in the combustion chamber. Of these quantities, only the exit pressure may be easily varied by changes in design. The jet velocity may be increased by reducing the pressure of the gases leaving the exit end of the nozzle. However, this pressure cannot be less than the pressure of the atmosphere into which the combustion gases are exhausting. Therefore, the most efficient reaction motor is one in which the pressure of the combustion gases at the exit end of the nozzle is the same as the pressure of the atmosphere into which they are entering. Reaction motors which are used to power vehicles traveling through the air frequently ascend to altitudes where the atmosphere is very thin. Rockets ascend to altitudes where the external pressure approaches a vacuum. Thus, a reaction motor nozzle which will deliver combustion gases to the exit end of the nozzle at 14.7 pounds per square inch pressure will give efficient performance at sea level. However, at high altitudes the gases passing through such a nozzle will expand considerably after leaving the nozzle, and the work thus performed by the gases produces no thrust.

In order to avoid some of the loss, rocket motor nozzles are frequently designed to perform best at an elevation of about 1.5 miles. This design is, at best, an unsatisfactory compromise since the rocket motor will not deliver maximum fuel economy at altitudes below or above 1.5 miles.

It is an object of this invention to provide a reaction motor with a nozzle wherein the cross-sectional open area of the throat may be changed and wherein the rate of feed of driving fluid may be decreased as the throat area of the nozzle is decreased.

Another object of the invention is to provide a reaction motor wherein the pressure of the gases emerging from the exit end of the nozzle is the same as the pressure of the atmosphere into which the gases are exhausting.

A further object of the invention is to provide a reaction motor which will operate efficiently through variable external pressures.

Another object of the invention is to obtain a maximum thrust efficiency when throttling is desired.

Briefly stated, in accordance with one aspect of my invention, I provide a reaction motor with a combustion chamber having a core piece coaxial with the nozzle, the core piece having a tapered end positioned in the vicinity of the nozzle throat. The core piece is axially movable in response to variations in the pressure of the medium surrounding the reaction motor whereby the position of the tapered end with reference to the throat of the nozzle determines the cross-sectional open area of the nozzle throat. Cooperating with the core piece is a driving fluid metering device which decreases the driving fluid rate of feed as the cross-sectional open area of the nozzle throat is decreased.

In the drawing, Fig. 1 is a diagrammatic cross-sectional view of a reaction motor of a type particularly designed for rocket operation. In the drawing a housing 10 contains a casing 11 defining a combustion chamber 12 and a nozzle 13 having a restricted throat portion 14. A yoke piece 20 is rigidly connected with the fuel feed needle valve 18, oxidizer feed needle valve 19 and the central core piece 21. Angle irons 16, 17 and 20a connected to the housing 10 support and guide the fuel feed needle valve 18, the oxidizer feed needle valve 19, and the central core piece 21 which is coaxial with the nozzle 13.

The core piece 21 is arranged for axial movement under the control of a cam 22 which, with its rotating drive 23 and worm 24, is positioned at the front end of the motor by means of angles 25 attached to the angles 16. A headpiece 26 at the front end of the combustion chamber 12 has a central aperture through which the core piece 21 has freedom of movement. A portion of the central aperture in the headpiece 26 has a carbon packing ring 27 held in position by a retainer screw 28. The carbon packing ring 27 serves to prevent the escape of gases from the combustion chamber 12, in a forward direction. The retainer screw 28 serves as a seat for a spring 29 which cooperates with a flange 30 and collar 31 mounted on the core piece 21 to maintain the core piece biased against the cam 22. The end of the core piece 21 protruding into the combustion chamber 12 has an annular tube 32 extending to a point near the end thereof. The tube 32 leads to a nipple 33 mounted on the core piece 21. A nipple 34 mounted on the core piece 21 communicates with the annular space between the tube 32 and the outside of the core piece 21.

A nipple 33 serves as a means for introducing cooling fluid and a nipple 34 as an exit for the cooling fluid for the core piece 21. The end portion of the core piece 21 protruding into the combustion chamber 12 terminates in a taper 35 which may be moved through the nozzle throat 14 in accordance with the position of the cam 22.

The fuel feed needle valve 18 is held in position by a bushing 36 mounted on the angle 16 and an aperture in a packing nut 37 mounted on an elbow 38 which is retained in position by attachment to the frame 17. The needle 18 has a range of longitudinal movement limited by the position of a nut 39. A collar 40 fixedly positions the needle 18 with reference to the yoke 20 thereby enabling the cam 22 to control the motion of the needle 18 as well as the core piece 21. Bias is maintained on the needle 18 by means of a compression coil spring 41 which may be a bellows type of spring. If the spring 41 is of the bellows type, a gasket 42 between the packing nut 37 and elbow 38 may be omitted. However, it is desirable to have a loose fitting gasket 42 as well as a bellows type spring 41 since a loose fitting gasket 42 does not offer so much friction to the movement of the needle 18 and the bellows prevents any leakage of fuel in the event the gasket 42 leaks. A fuel inlet nipple 43 is connected to the elbow 38 and a fuel reservoir 44 shown in block form is connected to the inlet nipple 43. An outlet nipple 45 is shown welded to the elbow 38. The elbow 38 also defines a small reservoir 46 in the needle tip chamber.

The oxidizer feed valve 19 is similar to the fuel feed valve 18, and for this reason similar parts in the valve 19 have been given the same number as corresponding parts of valve 18, except that the subscript "a" has been added. A liquid oxidizer reservoir 50 is shown in block form connected to the liquid oxidizer intake nipple 43a.

The combustion chamber headpiece 26 is equipped with an oxidizer feed nipple 51 and a fuel feed nipple 52.

The oxidizer may be used as a cooling agent in which case the nipple 45a is connected to the nipple 33 by a first conduit and the nipple 34 to the nipple 51 by a second. A third conduit connects the nipple 45 to the nipple 52.

The cam 22 is actuated by a pressure responsive control whereby a decrease in the pressure external to the combustion chamber advances the cam in a clockwise direction in the view shown. The pressure responsive control may be of any of the types of servo mechanism well known in the art and therefore this control is shown in block form at 55. It should be noted that the design of the rocket vehicle illustrated is such that the housing 10 is not hermetically sealed from the medium surrounding it and, therefore, the pressure within the housing 10, but external to the combustion chamber 12 will be substantially the same as the pressure of this medium. Therefore, the pressure responsive control 55 actuates the cam 22 in response to variations in the pressure of the medium surrounding the housing 10. It will be understood however that in certain vehicle designs, the housing 10 will be hermetically sealed from the surrounding medium, and that the pressure responsive control 55 of this invention, when used with such designs, will be responsive to variations in pressure of this medium through a means such as a Pitot tube mounted in communication with the surrounding medium. Also the fuel tank 44 and oxidizer tank 50 are shown very small for purposes of illustration. However, in an actual rocket, a large part of the weight and space would be occupied by these two tanks.

In the operation of the device shown in the drawing, the cam 22 is initially in the position shown which sets the throat 14 for maximum cross-sectional open area. If the fuel used is gasoline and the oxidizer liquid oxygen, the valves 18 and 19 are set by means of the nuts 39 and 39a to give a liquid oxygen fuel feed ratio of approximately 2.5 to 1. The valves 18 and 19 must also be set to provide a feed rate which will bring the pressure in the combustion chamber 12 to its rated capacity. A typical combustion chamber pressure is about 300 pounds per square inch. The needle valves are further designed to decrease the fuel flow and oxidizer flow at a rate exactly corresponding to the decrease in cross-sectional open area of the throat 14 as the core piece 21 is advanced therethrough.

With the apparatus adjusted as set forth above, the driving fluids are introduced to the combustion chamber 12 and ignited by means well known in the art but not illustrated here in order to avoid complexity of illustration. After takeoff, the pressure responsive control 55 rotates the cam 22 in a clockwise direction as the external pressure decreases. This rotation advances the tapered portion 35 of the core piece 21 into the throat 14 thereby decreasing its cross-sectional open area. At the same time this motion of the cam 22 advances the needle valves 18 and 19 in a direction to slow up the rate of feed of the driving fluids, thereby maintaining the pressure in the combustion chamber 12 constant. The pressure of the combustion gases at the exit end of the nozzle 13 is thus maintained at the same level as the pressure of the medium into which the gases are exhausting.

In the illustrated embodiment the driving fluid feed rate and core piece position are all controlled by the cam 22. This necessitates very careful adjustment of the parts. This careful adjustment may be avoided at the expense of additional weight by having the cam 22 set the position of the core piece 21 only and by having a separate control responsive to pressure in the combustion chamber 12 set the driving fluid feed rate.

The constantly diminishing driving fluid feed rate results in a decrease in thrust during the flight of the rocket to higher altitudes. However, this decrease is more than made up by the improved driving fluid economy, a factor of particular importance in achieving long-distance flight in a horizontal direction, or when throttling is desired.

While the present invention has been described with reference to a particular embodiment thereof, it will be understood that numerous additional modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A reaction motor comprising a casing defining a combustion chamber and thrust nozzle and adapted for operation in regions where there are variations in the pressure of the medium into which the combustion gases exit, an elongated hollow core piece positioned on the interior of said combustion chamber in axial alignment with said nozzle, the end of said core piece nearest said nozzle being tapered, means for circulating cooling fluid through the interior of said core piece, means responsive to variations in said pressure for imparting axial movement to said core piece whereby the position of the tapered end with reference to the nozzle determines the cross-sectional open area of said throat, means for introducing driving fluids to the combustion chamber, means for controlling the feed rate of said driving fluids to limit the pressure build up in the combustion chamber, fixedly positioned linking means interconnecting said means for imparting axial movement to said core piece and said means for controlling the feed rate of said driving fluids whereby a decrease in the cross-sectional area of said nozzle throat area is accompanied by a decrease in the feed rate of said driving fluids.

2. A reaction motor comprising a casing defining a combustion chamber and thrust nozzle, an elongated hollow core piece positioned on the interior of said combustion chamber in axial alignment with said nozzle, the end of said core piece nearest said nozzle being tapered, means for circulating cooling fluid through the interior of said core piece, means for imparting axial movement to said core piece whereby the position of the tapered end with reference to the nozzle determines the cross-sectional open area of said throat, means for introducing driving fluids to the combustion chamber, means for controlling the feed rate of said driving fluids to limit the pressure build up in the combustion chamber, fixedly positioned linking means interconnecting said means for imparting axial movement to said core piece and said means for controlling the feed rate of said driving liquids whereby a decrease in the cross-sectional area of said nozzle throat area is accompanied by a decrease in the feed rate of said driving fluids, the flow rate of the driving fluids in said reaction motor being controlled by needle valves.

(References on following page)

References Cited in the file of this patent

UNITED STATES PATENTS

| | | |
|---|---|---|
| 2,483,401 | Cole | Oct. 4, 1949 |
| 2,510,506 | Lindhagen et al. | June 6, 1950 |
| 2,520,967 | Schmitt | Sept. 5, 1950 |
| 2,551,372 | Haltenberger | May 1, 1951 |
| 2,557,883 | Miller | June 19, 1951 |
| 2,580,962 | Sedille | Jan. 1, 1952 |
| 2,637,973 | Lawrence | May 12, 1953 |

FOREIGN PATENTS

| | | |
|---|---|---|
| 941,556 | France | July 19, 1948 |